April 25, 1933.   F. O'NEILL   1,906,086
GLASS BLANK TRANSFER
Original Filed Aug. 19, 1918
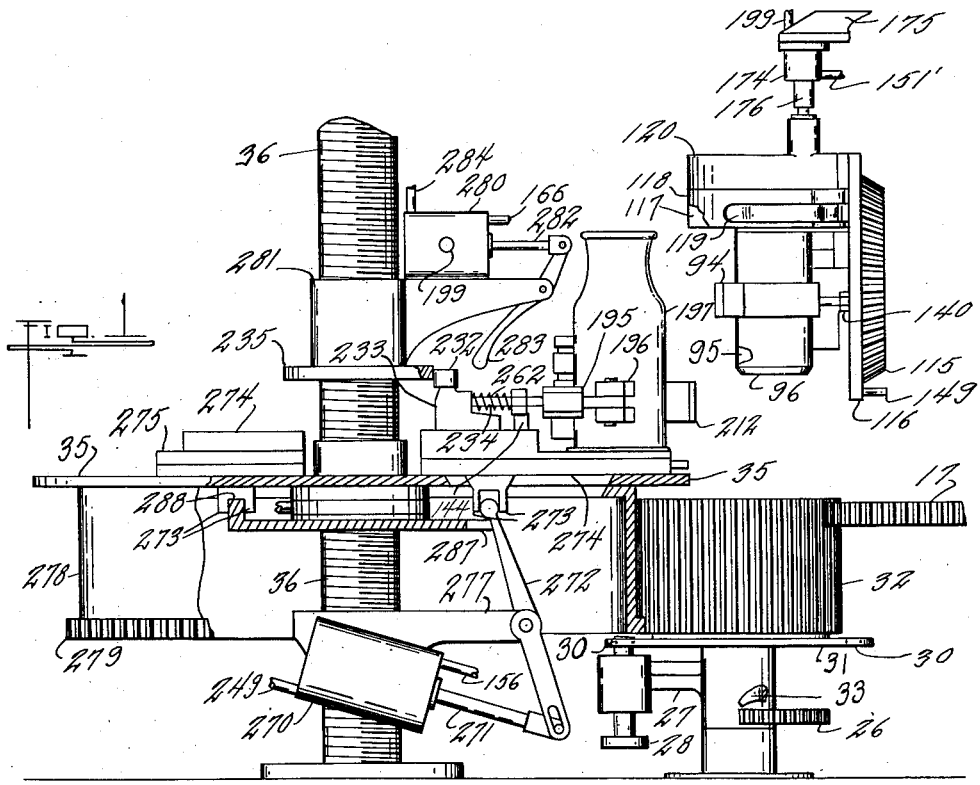
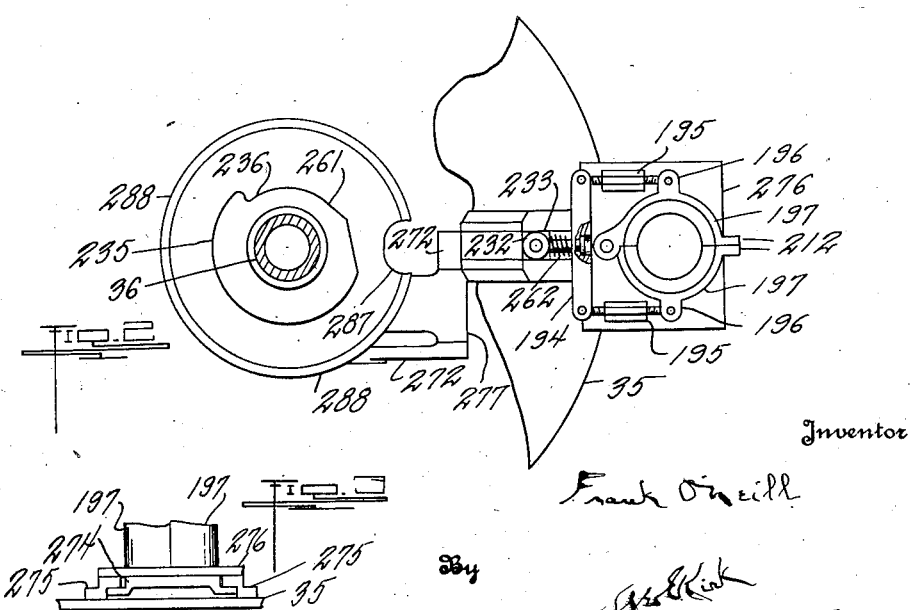
Inventor
Frank O'Neill
By
Attorney Patented Apr. 25, 1933

1,906,086

UNITED STATES PATENT OFFICE

FRANK O'NEILL, OF TOLEDO, OHIO

GLASS BLANK TRANSFER

Original application filed August 19, 1918, Serial No. 250,488. Divided and this application filed September 7, 1929. Serial No. 390,956.

This invention relates to the control in determined sequence of various devices in series providing an automatic complete apparatus, as for performing successively operations upon a substance, herein shown as the shaping of molten glass into ware.

This invention has utility when incorporated in apparatus for the production of hollow ware, as glass bottles.

Referring to the drawing:

Fig. 1 is a fragmentary elevation of transfer station with radially movable blow molds for taking the blank;

Fig. 2 is a plan view of the outwardly thrown closed blow mold of Fig. 1; and

Fig. 3 is a fragmentary detail of the slide mounting of the radially movable blow mold of Fig. 1.

The feature of transfer herein disclosed may be brought about by an actual movement of the blow mold over to receive the suspended blank at the region of proximity between the tables. In such embodiment there is provided below the table 35 an inclined cylinder 270 to which line 156 extends for a timely supply of power air. This power air causes piston rod 271 to be drawn into the cylinder 270, thereby rocking the angle lever 272 engaging between the pair of prongs 273 of a downwardly projecting fork upon a slide 274 reciprocable radially of the column 36 in guides 275 carried by the table 35.

This slide 274 carries a base 276 upon which is mounted below mold sections 197 and the control mechanism therefor. In the use of the term blow mold sections such is herein used to mean a succeeding, a finish forming or an additional operation after the blank forming. The cylinder 270 and the lever 272 are carried by a bracket 277 mounted on the column 36 below the table 35. In order that there may be clearance for this co-action of the thrust out device by the cylinder 270, the table 35 carries a downwardly extending flange or skirt 278 terminating in a toothed portion 279 in mesh with intermediate driving gear 32.

The blow mold sections 197 in traveling from fully open position at the take-off in the region of cam portion 236 to the transfer for receiving a blank from the table having the gear 17, are partially closed by the cam portion 261, while after being closed about the blank at the transfer station, in then riding therefrom about the cam 235, a spring 262 about the rod 234 yieldably maintains this closed relation. The partial closing of the blow mold sections 197 by riding on the cam 261, leaves a minimum of opening for supplying the blank thereinto, while the remaining short travel distance for completing the closing may occur rapidly without seriously hammering the sections against each other, for the movement is so slight.

In this outward thrust, the blow mold sections 197 are open sufficiently wide to embrace the suspended blank held by the neck mold sections 117, 118.

In sequence thereafter power air from line 166 enters the outer end of horizontal cylinder 280 carried by a bracket 281 for extending radially away from the column 36. This power air causes piston rod 282 to travel into the cylinder 280, rocking lever 283 fulcrumed in the bracket 281, so that the lower end of the lever 283 engages behind or on the inner side of the roller 232 as carried out on the base 276. This roller 232 moves outward with the slide 233 on which the roller is mounted. Spring 262 is about the rod 234 which rod extends freely through the crosshead 194. The spring 262 thus acts yieldingly to thrust the crosshead 194 outwardly. The crosshead 194 acting through the adjustable links 195 yieldably closes the blow mold sections 197 about the blank.

Simultaneous with the embracing of the blank in the blank mold sections as sustained by the neck mold sections 117, 118, or properly timed therewith, occurs the downward travel of plunger 176 from the cylinder 174 as effected by line 199 from a port medially of the length of the cylinder 280 extending to the cylinder 174. This travel of the plunger 176 opens the neck mold sections 117, 118, thus releasing the blank into the blow mold sections 197 as closed thereabout.

Line 249 from the distributing valve (see 39 in United States Patent 1,602,906, October 12, 1926), in this instance leads to the after end of the cylinder 270, effecting an outward throw of the piston rod 271 and a rocking of the lever 272 fulcrumed in the bracket 277 for drawing the closed blow mold sections 197 with the blank therein back into position upon the table 35. Simultaneously air is supplied to the inner end of the cylinder 280 by branch line 284 from the duct 249, thus getting the lever 283 out of the way of the roller 232 and resetting this final blow mold closing device for the next operation.

As the next gather of molten glass is charged into blank mold sections 95, 96, and there occurs the next 60° Travel step of the table 35, the forks 273 ride clear of opening 287 to embrace upstanding flange 288 mounted against rotation on the column 36 below the table 35. The base 276 is accordingly positively held against radial travel.

The vertical adjustment of the second table 35, with its gear 34 as readily permitted by the long teeth of the intermediate gear 32, in the taking care of different lengths of ware, is readily accomplished by the insertion or removal of washers below the bearing on the column 36 sustaining the table 35. There is interconnection for common simultaneous travel of the tables.

Segment gear 26 has oppositely extending therefrom an arm 27 carrying a pin 28 normally thrust upwardly to enter opening 30 in flange extension 31 carried by a long toothed intermediate driving gear 32 mounted on shaft 33 coaxial with the segment 26.

This application is a division of my copending application for United States Letters Patent S.N. 250,488, filed August 19, 1918 maturing into Patent 1,758,085 of May 13, 1930.

What is claimed and it is desired to secure by Letters Patent is:

1. A glass forming machine embodying a sectional blank mold, a sectional neck mold clear of which the blank mold is movable to leave the neck mold to carry a formed blank, a blow mold, a first rotary carrier for the blank and neck molds, a second laterally spaced rotary carrier for the blow mold, means for opening the blank mold to leave the neck mold closed to carry a blank therefrom, control mechanism for shifting the blow mold outwardly of the second carrier and then closing the blow mold about the blank as carried by the neck mold, and opening means for the neck mold for releasing the blank into the blow mold.

2. A glass forming machine embodying first and second laterally spaced rotary carriers, sectional blank and neck molds on the first carrier having alignment therebetween at all closed positions of the blank mold and its companion neck mold, a sectional blow mold on the second carrier, and control means for driving the molds effective for shifting the blow mold inwardly toward the first carrier into position as to the closed neck mold in lieu of the blank mold as open therefrom, and additional means for opening the neck mold for thereby releasing the neck held blank into the blow mold.

3. A glass forming machine embodying first and second laterally spaced rotary carriers, sectional blank and neck molds on the first carrier having alignment therebetween at all closed positions of the blank mold and its companion neck mold, a sectional blow mold on the second carrier, driving means for rotating the carriers, blank mold control means for opening the blank mold to leave a formed blank suspended from the closed neck mold for said blank mold, there being synchronous control means for radially shifting the blow mold as to the second carrier into closed position about the suspended blank as held by the neck mold, and opening means for the neck mold for thereby releasing the blank from the first carrier into the closed blow mold of the second carrier.

4. A glass forming machine embodying first and second laterally spaced rotary carriers, sectional blank and neck molds on the first carrier movable into proximity to the second carrier, opening means for the blank mold to leave the neck mold closed thereover and suspending a formed blank, a blow mold radially movable as to the second carrier into suspended blank embracing position, and neck mold opening means for releasing the blow mold embraced blank.

5. A glass forming machine embodying first and second laterally spaced rotary carriers, a pair of blank mold sections, a pair of neck mold sections, hinge mountings for the sections on the first carrier for closed cycle travel therewith, said blank mold sections being openable to leave the neck sections closed to suspend a formed blank, a pair of blow mold sections radially shiftable on the second carrier, control means for bringing the blow mold sections into blank embracing position, and opening means for the neck mold sections to release the blank.

6. A glass forming machine embodying first and second laterally spaced rotary carriers, a pair of blank mold sections, a pair of neck mold sections, hinge mountings for the sections on the first carrier for closed cycle travel therewith, said blank mold sections being openable to leave the neck sections closed to suspend a formed blank, a pair of blow mold sections, a slide mounting said sections for radial movement on the second carrier, control means for bringing the blow mold sections into blank embracing position, and opening means for the neck mold sections to release the blank.

7. A glass forming machine, comprising two mold-carrying tables movable in timed relation one with the other, a cooperating blank mold and neck mold carried by one of said tables, an independent means for opening the blank mold, a blow mold carried by the other table, means for advancing the blow mold while open relatively to the latter table and to a position to receive a blank carried by the neck mold, separate means operating in timed relation for closing the blow mold and means for opening the neck mold, said several means cooperating to transfer a blank from the neck mold to said blow mold.

8. A glass forming machine comprising two rotatable mold-carrying tables movable in timed relation one with the other, a cooperating blank mold and neck mold carried by one of said tables and movable in a circle about the axis of rotation of said table, a blow mold carried by the other table, means for advancing the open blow mold relatively to the latter table and toward the line of travel of said neck mold, separate means operating in timed relation for closing said blow mold around a blank and means for opening the neck mold, said several means cooperating to transfer a blank from the neck mold to said blow mold.

9. In a glass forming machine, a rotatable table, axially aligned blank and neck molds mounted thereon, a second table movable in timed relation with said first table, a blow mold mounted thereon, separate means for opening said blank mold and said neck mold, means for advancing said blow mold, while open, and relatively to the latter table, toward the second table to a blank receiving position, separate means operating in timed relation, for closing said blow mold around a blank and means for opening said neck mold, said several means cooperating to transfer a blank from the neck mold to said blow mold.

10. Apparatus for forming glass comprising blank forming means, carrying means for the forming means in an arc of a circular path, controlling means for the forming means for bringing a blank therein into suspended position in said path, embracing means for the suspended blank, blank release effecting means for acting upon the forming means for freeing the blank to be held by the embracing means, retracting means for the embraced blank from the circular path, blowing means for thereafter causing the blank to be formed into an article of ware, and actuating means for causing the embracing means to travel in an arc of an additional circular path, laterally spaced from the path of the blank forming means.

11. A two-table rotating glass forming machine provided with a blank mold and neck ring mounted on one table and a blow mold mounted on the other table, means for rotating said tables, means for effecting the transfer of a blank to the blow mold, means for moving the blow mold relative to its table to cause it to reach a position below and approximately concentric with the neck ring.

12. Apparatus for fabricating glassware, means for forming a parison, including a parison mold and neck ring adapted to move in a closed path about a center, a blow mold mounted to move in a closed path about a different center, means for moving the parison mold and neck mold and the blow mold about their respective centers, means for opening and closing the molds, and means for moving the blow mold radially of its center of movement and causing it to reach a position approximately in the path of the parison mold for a space sufficient to accomplish the transfer of a parison formed in the parison mold to the blow mold.

13. A rotating two-table glass forming machine, comprising means for rotating said tables, a blank mold and neck ring mounted on one of said tables and adapted to receive a charge of molten glass and to form the same into a glass parison, a blow mold mounted upon the other of said tables and adapted to receive the parison and to impart final form thereto, means for moving the blow mold relatively to its table and for causing it to reach a position in a path concentric with and below the neck ring during a portion of its travel, means for opening the blank mold while the neck ring is closed about the neck of a parison, means for closing the blow mold about the suspended parison while it is below and in a path concentric with the path of the neck ring, and means for then opening the neck ring.

14. A rotating two-table glass fabricating machine, means for rotating said tables, means mounted on one of said tables for forming a parison and including a neck ring, means for causing a formed parison to become suspended from the neck ring, a blow mold mounted on the second of said tables, and means for moving the blow mold relatively to its table and for causing it to close about the suspended parison and immediately below the neck ring, and means for then opening the neck ring.

15. A rotating two-table glass fabricating machine, means for rotating said tables, a blow mold and means for opening and closing the same, means for slidably mounting the blow mold upon one of the rotating tables, and control means for moving the blow mold radially of said table for causing it to reach a position in a circular path about the center of the other table, and means carried upon the other table for forming a parison and then presenting it to the blow mold.

16. A glassware fabricating machine comprising a blank mold table, a blank mold thereon, a neck mold associated with the blank mold, means for constantly supporting said molds in position to be closed in axial alignment with each other, a blow mold table, a blow mold thereon, means for rotating said tables, the rotation of said mold tables causing the blank and neck molds and the blow mold simultaneously to approach each other at a transfer zone, means operating in synchronism with the rotation of the mold table for opening the blank mold adjacent the transfer zone, to leave a previously formed parison suspended from the neck mold, means for opening the blow mold, means actuated in timed relation to the arrival of the molds in the transfer zone for imparting a lateral component of motion to the open blow mold toward the suspended parison, said last named means being constructed to cause the blow mold to reach a position in the path of the neck mold and parison in the transfer zone, means for thereafter closing the blow mold about the parison, and means for then opening the neck mold to release the parison in the blow mold, whereby the parison is transferred to the blow mold.

17. A glassware fabricating machine comprising a blank mold table, a blank mold thereon, a neck mold associated with the blank mold, means for constantly supporting said molds in position to be closed in axial alignment with each other, a blow mold table, a blow mold thereon, means for rotating said tables, the rotation of said mold tables causing the blank and neck mold and the blow mold simultaneously to approach each other at a transfer zone, and the said parison and neck molds and the blow mold being so positioned on their respective tables that they come into alignment on a line between the centers of the said tables in said transfer zone, means operating in synchronism with the rotation of the mold table for opening the blank mold adjacent the transfer zone to leave a previously formed parison suspended from the neck mold, means for opening the blow mold, means actuated in timed relation to the arrival of the molds at the transfer zone for imparting a lateral component of motion to the open blow mold toward the suspended parison and to cause the blow mold to approach axial alignment with the parison, means for closing the blow mold about the parison, means for then opening the neck mold to release the parison in the blow mold, whereby the parison is transferred to the blow mold, the means for moving the blow mold laterally and for closing the blow mold being so designed and timed with respect to the rotation of the mold tables that the delivery of the parison to the blow mold is effected substantially on the line connecting the centers of the said tables.

18. A glassware fabricating machine comprising a blank mold table, a blank mold thereon, a neck mold associated with the blank mold, means for constantly supporting said molds in a position to be closed in axial alignment with each other, a blow mold table, a blow mold thereon, means for rotating said tables, the rotation of said tables causing the blank and neck molds and the blow mold simultaneously to approach each other at a transfer zone, means operating in synchronism with the rotation of the mold tables for opening the blank mold adjacent the transfer zone, to leave a previously formed parison suspended from the neck mold, means for opening the blow mold, and means actuated in timed relation with the arrival of the molds at the transfer zone for imparting a lateral component of motion to the open blow mold toward the suspended parison, said last-named means being constructed to cause the blow mold to approach the path of movement of the parison about the axis of the blank mold table, means for closing the blow mold about the parison, and means for opening the neck mold to release the parison in the blow mold, whereby the parison is then transferred to the blow mold.

In witness whereof I affix my signature.

FRANK O'NEILL.